US009678236B2

(12) United States Patent
Rodney et al.

(10) Patent No.: US 9,678,236 B2
(45) Date of Patent: Jun. 13, 2017

(54) FRACTURE CHARACTERIZATION BY INTERFEROMETRIC DRILLBIT IMAGING, TIME REVERSAL IMAGING OF FRACTURES USING DRILL BIT SEISMICS, AND MONITORING OF FRACTURE GENERATION VIA TIME REVERSED ACOUSTICS AND ELECTROSEISMICS

(75) Inventors: Paul F. Rodney, Spring, TX (US); Stewart Arthur Levin, Centennial, CO (US)

(73) Assignee: Halliburton Energy Services, Inc., Houston, TX (US)

( * ) Notice: Subject to any disclaimer, the term of this patent is extended or adjusted under 35 U.S.C. 154(b) by 1202 days.

(21) Appl. No.: 13/642,029

(22) PCT Filed: Apr. 27, 2010

(86) PCT No.: PCT/US2010/032565
§ 371 (c)(1),
(2), (4) Date: Dec. 27, 2012

(87) PCT Pub. No.: WO2011/136760
PCT Pub. Date: Nov. 3, 2011

(65) Prior Publication Data
US 2013/0116926 A1     May 9, 2013

(51) Int. Cl.
*G01V 1/40*     (2006.01)
*G01V 3/00*     (2006.01)
(Continued)

(52) U.S. Cl.
CPC .................. *G01V 1/40* (2013.01); *G01V 1/42* (2013.01); *G06F 17/00* (2013.01)

(58) Field of Classification Search
CPC ............. G01V 1/42; G01V 1/40; G06F 17/00
(Continued)

(56) References Cited

U.S. PATENT DOCUMENTS

| 4,491,796 A | 1/1985 | Smith |
| 4,587,641 A | 5/1986 | DiFoggio |

(Continued)

FOREIGN PATENT DOCUMENTS

| CN | 1033673 A | 7/1989 |
| CN | 101082276 A | 12/2007 |

(Continued)

OTHER PUBLICATIONS

"International Application Serial No. PCT/US2010/032565 Written Opinion mailed Jun. 24, 2010", 9 Pgs.

(Continued)

*Primary Examiner* — Daniel L Murphy
(74) *Attorney, Agent, or Firm* — Gilliam IP PLLC

(57) ABSTRACT

Apparatus, systems, and methods may operate to receive radiated energy as scattered energy after the radiated energy interacts with a geologic formation, wherein the scattered energy is received at a sub-surface multi-channel sensor array that operates to transform the scattered energy into received signals, and wherein the radiated energy is provided by a sub-surface source of elastic energy; and to identify discontinuous features in the geologic formation by interferometric comparison of the received signals as elastic signals and/or electromagnetic signals among some sensors in the sensor array, or by time-reversal propagation of the received signals as elastic and/or electromagnetic signals in a numeric model of a volume of the geologic formation. Additional apparatus, systems, and methods are disclosed.

22 Claims, 7 Drawing Sheets

(51) Int. Cl.
*G01V 1/42* (2006.01)
*G06F 17/00* (2006.01)

(58) Field of Classification Search
USPC .................. 367/35, 25; 702/8, 11; 324/338
See application file for complete search history.

(56) References Cited

U.S. PATENT DOCUMENTS

| | | |
|---|---|---|
| 4,744,245 A | 5/1988 | White |
| 4,858,130 A | 8/1989 | Widrow |
| 4,899,112 A | 2/1990 | Clark et al. |
| 4,962,490 A | 10/1990 | Lyle et al. |
| 5,010,527 A | 4/1991 | Mahrer |
| 5,124,952 A | 6/1992 | Knize et al. |
| 5,243,190 A | 9/1993 | Bandy et al. |
| 5,322,126 A | 6/1994 | Scott, III |
| 5,377,104 A | 12/1994 | Sorrells et al. |
| 5,519,322 A | 5/1996 | Pozzi et al. |
| 5,926,437 A | 7/1999 | Ortiz |
| 5,963,508 A | 10/1999 | Withers |
| 6,151,554 A | 11/2000 | Rodney |
| 6,462,549 B1 | 10/2002 | Curtis et al. |
| 6,978,831 B2 | 12/2005 | Nguyen |
| 7,082,993 B2 | 8/2006 | Ayoub et al. |
| 7,100,688 B2 | 9/2006 | Stephenson et al. |
| 7,134,492 B2 | 11/2006 | Willberg et al. |
| 7,382,135 B2 | 6/2008 | Li et al. |
| 7,424,911 B2 | 9/2008 | McCarthy et al. |
| 7,460,436 B2 | 12/2008 | Segall et al. |
| 7,472,748 B2 | 1/2009 | Gdanski et al. |
| 7,543,635 B2 | 6/2009 | East et al. |
| 2004/0226715 A1 | 11/2004 | Willberg et al. |
| 2005/0017723 A1 | 1/2005 | Entov et al. |
| 2007/0256830 A1 | 11/2007 | Entov |
| 2009/0166030 A1 | 7/2009 | Zhuravlev et al. |
| 2010/0039893 A1 | 2/2010 | Segal et al. |

FOREIGN PATENT DOCUMENTS

| | | |
|---|---|---|
| GB | 2404253 A | 1/2005 |
| GB | 2409722 A | 7/2005 |
| JP | 06-66950 A | 3/1994 |
| JP | 6066950 A | 3/1994 |
| WO | WO-2007037721 A1 | 4/2007 |
| WO | WO-2011136760 A1 | 11/2011 |

OTHER PUBLICATIONS

"International Application Serial No. PCT/US2010/032565, International Preliminary Report on Patentability mailed Oct. 24, 2011", 22 pgs.
"International Application Serial No. PCT/US2010/032565, Search Report mailed Jun. 24, 2010", 4 pgs.
Poletto, F., et al., "Seismic interferometry with a TBM source of transmitted and reflected waves", Geophysics, 71(4), (2006), SI85-SI93.
Rector, J. W, et al., "The use of drill-bit energy as a downhole seismic source", Geophysics, 56(5), (1991), 628-634.
Shrivastava, Abhishek, et al., "Numerical Investigation of Electromagnetic Emission at the Apex of a Crack", IAGA WG 1.2 Workshops on Electromagnetic Induction in the Earth, http://www.emindia2004.org, (2004), 1-4.
Willis, M., et al., "Spatial orientation and distribution of reservoir fractures from scattered seismic energy", 74th Annual International Meeting, SEG, Expanded Abstracts, (2004), 1535-1538.
Willis, Mark, et al., "A novel application of time-reversed acoustics: Salt-dome flank imaging using walkaway VSP surveys", Geophysics, 71(2), (2006), A7-A11.
Yu, J., et al., "Autocorrelogram Migration of Drill-Bit Data", 63rd EAGE Conference & Exhibition, Session: VSP Imaging, (2001), 1-4.
"Gulf Cooperation Council Application Serial No. 2011/18294, Office Action mailed Dec. 23, 2014", 4 pgs.
"United Kingdom Application Serial No. 1219146.6, Office Action mailed Feb. 16, 2015", 4 pgs.
"Chinese Application Serial No. 201080066459.1, Office Action mailed Feb. 28, 2015", (w/ English Translation), 31 pgs.
"Canadian Application Serial No. 2,796,237, Office Action mailed Jun. 4, 2015", 3 pgs.
"Canadian Application Serial No. 2,796,237, Response filed Nov. 19, 2015 to Office Action mailed Jun. 4, 2015", 5 pgs.
"Chinese Application Serial No. 201080066459.1, Office Action mailed May 10, 2016", (w/English Translation), 1-12.
"Chinese Application Serial No. 201080066459.1, Office Action mailed Nov. 12, 2015", (w/ English Translation), 33 pgs.
"United Kingdom Application Serial No. 1219146.6, Reply filed Nov. 10, 2015 to Examination Report mailed Jul. 28, 2015", 29 pgs.
"United Kingdom Application Serial No. 1219146.6, Response filed Jun. 11, 2015 to Office Action mailed Feb. 16, 2015", 25 pgs.
"Chinese Application Serial No. 201080066459.1, Response filed Jul. 15, 2015 to Office Action mailed Feb. 28, 2015", (w/ English Translation of Amended Claims), 22 pgs.
"United Kingdom Application Serial No. 1219146.6, Examination Report mailed Jul. 28, 2015", 3 pgs.
"Canadian Application Serial No. 2,796,237, Office Action mailed Jun. 4, 2014", 2 pgs.
"International Application Serial No. PCT/US2010/032565, Written Opinion mailed Jul. 13, 2011", 14 pgs.
"International Application Serial No. PCT/US2010/032565, Response filed Sep. 13, 2011 to Second Written Opinion mailed Jul. 13, 2011", 3 pgs.
"International Application Serial No. PCT/US2010/032565, Response filed Aug. 17, 2010 to Written Opinion mailed Jun. 24, 2010", 9 pgs.
Bakulin, Andrey, et al., "Virtual Shear Source: a new method for shear-wave seismic surveys", *75th Annual International Meeting, SEG Technical Procram Expanded Abstracts 2005*, (2005), 2633-2636.
Bakulin, Andrey, et al., "Virtual source: new method for imaging and 4D below complex overburden", *74th Annual International Meeting, SEG Technical Program Expanded Abstracts 2004*, (2004), 2477-2480.
Korneev, Valeri, et al., "On the fundamentals of the virtual source method", *Geophysics*, 71(3), (2006), A13-A17.
Liu, Enru, et al., "Analysis of freguency-dependent seismic anisotropy from a multicomponent VSP", *72nd Annual International Meeting, SEG Technical Program Expanded Abstracts 2002*, (2002), 101-104.
Lynn, Heloise B., et al., "P-wave AVOA Interpretation Needs the Input of Additional Information", *73rd Annual International Meeting, SEG Technical Progam Expanded Abstracts 2003*, (2003), 124-126.
"Canadian Application Serial No. 2,796,237, Response filed Nov. 21, 2014 to Office Action mailed Jun. 4, 2014", 19 pgs.

FRACTURE CHARACTERIZATION BY INTERFEROMETRIC DRILLBIT IMAGING, TIME REVERSAL IMAGING OF FRACTURES USING DRILL BIT SEISMICS, AND MONITORING OF FRACTURE GENERATION VIA TIME REVERSED ACOUSTICS AND ELECTROSEISMICS

RELATED APPLICATIONS

This application is a U.S. National Stage Filing under 35 U.S.C. 371 from International Application No. PCT/US2010/032565 filed on Apr. 27, 2010, and published as WO 2011/136760 A1 on Nov. 3, 2011; which application and publication are incorporated herein by reference in their entirety.

BACKGROUND

Fractures are subsurface features that often play a role in the flow of fluids in a reservoir, whether as a conduit or a barrier, and thus, it can be useful to detect and locate them. Fractures may be naturally occurring or artificially induced (e.g., by high pressure injection of fluid into subsurface formations). Detecting and locating fractures is useful in a number of hydrocarbon provinces, including large "tight gas" plays in the western United States, where commercial exploitation makes use of extensive fracturing to overcome low permeability in the reservoir rocks. Knowledge of existing fracture locations in and around a reservoir can be used to more efficiently employ drilling, hydraulic fracture treatments, and production.

Elastic energy generated by a sub-surface drill bit, or some other source, such as a vibratory or piezoelectric downhole source mounted near the drill bit, reflects and scatters off the interfaces and structures surrounding the borehole. Such energy may be recorded by receivers situated along a borehole under construction, along a monitoring borehole, or at the surface of the earth. Elastic energy may be converted to electromagnetic (EM) energy during scattering (via the seismoelectric effect) and recorded by corresponding EM receivers. Elastic and electromagnetic energy can also be generated directly during artificial fracture creation, and may be similarly recorded.

When a drill bit is used as the energy source, well known recording techniques use sensors placed on the drill string and drilling rig to measure, or at least estimate, the actual far-field signature of the source. In most cases the spectral content of signals provided by the drill bit source is more limited than that associated with a controlled source; the resulting image often has lower resolution and more artifacts.

When a controlled source is available on the drill string, vertical seismic profile (VSP) and cross-well analysis/imaging tools can be utilized to produce an image over a corridor or sub-volume of the formation. In this setting, one may achieve pragmatic operational savings by producing cross-well or VSP datasets in conjunction with drilling. In addition, the source energy may sometimes be generated and transmitted into the subsurface in a near pristine open hole environment, without delaying the placement of post-drill casing.

When artificial fracturing provides the energy source, the energy radiates away from the fracture and may be recorded by sensors located in one or more nearby boreholes. Commercial microseismic services use one or more arrays of elastic sensors to triangulate the location of microseisms generated by the fracturing process. However, there has been to date no investigation of how to use seismoelectrically generated electromagnetic radiation created by the fracturing process to separately, or jointly with microseismic recording, detect and locate the fracture.

In any of these cases, sensors used to record the presence of the energy can be deployed in ways that prove unsuitable for conventional subsurface imaging. For example, an array of sensors may be deployed in a sidetrack or nearby well at or near a reservoir interval to record seismic energy generated during horizontal drilling. Reflections from the bed boundaries within the reservoir (i.e., close to the drill bit), may be indistinguishable from direct arrivals. The recorded signal may also be heavily contaminated by guided waves reverberating within reservoir layering. As a result, reliable detection or location of many subsurface features of interest, such as fractures, can be a difficult challenge to overcome.

DETAILED DESCRIPTION

Figure 1:
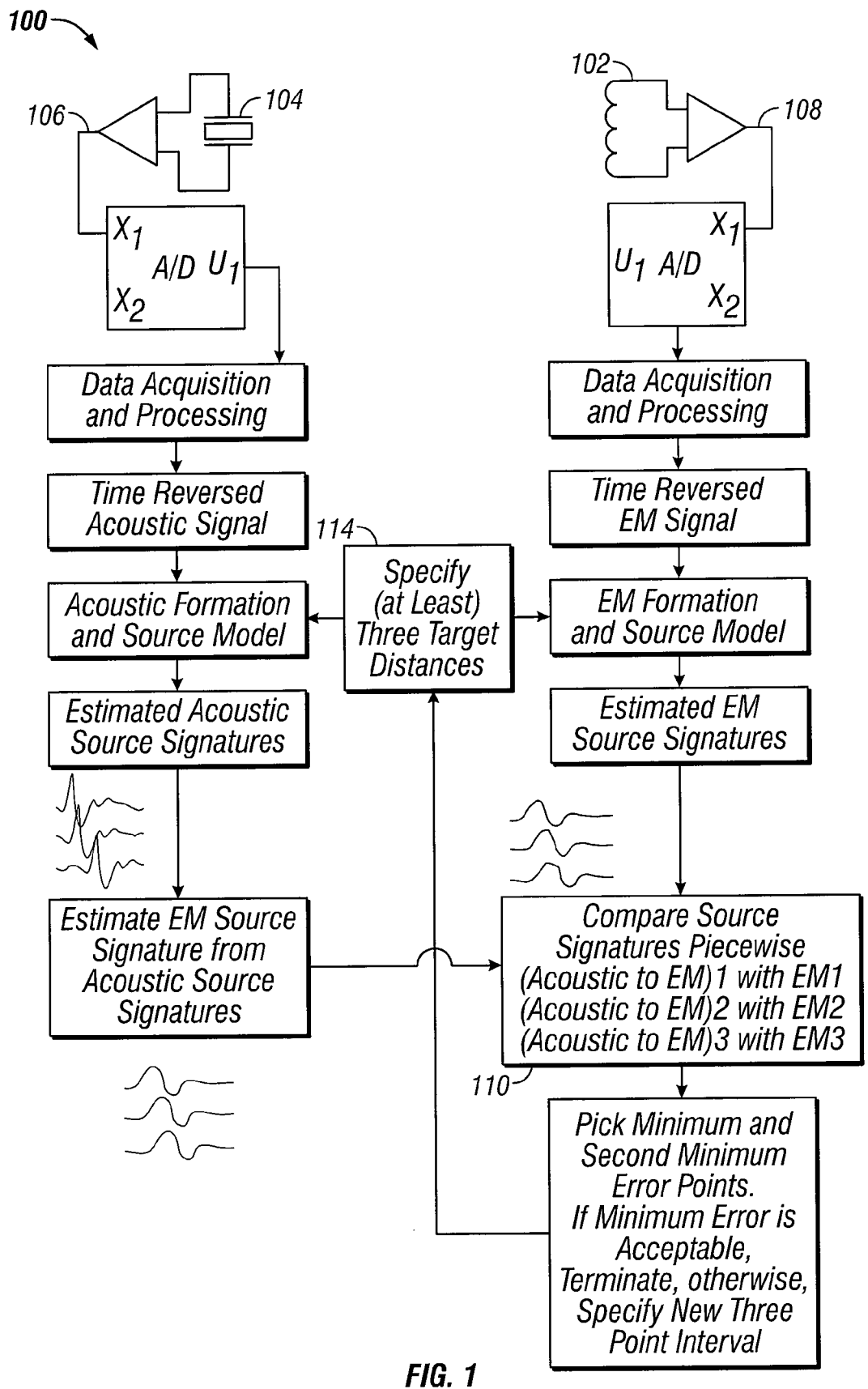
FIG. 1 is a functional block diagram illustrating apparatus and methods according to various embodiments of the invention.

In certain embodiments, apparatus, systems, and methods operate to locate preexisting fractures by irradiating them with elastic energy generated by a drill bit or controlled sources on the drill string, causing the fractures to act as a secondary source of elastic and electromagnetic energy that radiates back into the subsurface, where it may be detected by appropriate sensors. In some embodiments, apparatus, systems, and methods operate to locate fractures as they are generated, whether spontaneously during the drilling process, for example, or as a result of a commercial fraccing operation. In many embodiments, elastic, magnetic, and/or electric field emissions resulting from fracture initiation or irradiation are monitored using appropriate sensors. In many of these embodiments, time-reversal signal processing is used to closely determine the location of the fractures within the formation. In this way, not only the location of the fractures, but the extent of the formation affected by the fractures, and the orientation of the fractures, can be reliably determined.

Thus, in certain embodiments, a source of elastic energy is used. Consider that elastic energy comprising seismic source energy propagates outwards in all directions, not just within some plane of reflection. Thus, when this energy encounters an impedance discontinuity in the subsurface, contained within or cutting across normal depositional bedding, some of the energy is scattered at the discontinuity, so as to be received at sensors along the well bore. The location of the discontinuity can then be identified, using various processing techniques described below. Examples of discontinuities include vugs and clasts, faults, and the edges of fractures.

To obtain fracture location information from borehole-based sensors located at or near a fracture subsurface formation, at least two different unconventional imaging methods can be used—each may provide images of fracturing in the vicinity of the borehole. Both can make use of the fracture itself as a primary or secondary source.

The first unconventional method combines techniques from interferometry and microseismic monitoring analysis to detect and locate discontinuities as secondary sources. For a controlled near-drill bit source, a multichannel seismogram recorded at the array of sensors deployed in a sidetrack or nearby well has a curved arrival from each secondary source, due to the scattering of signals emitted by each near-drill bit source activation. In the ordinary case where three-component sensors are used, both compression (P-wave) and shear (S-wave) arrivals are detected. With a fixed borehole array, the form of these arrivals remains the same because the location of the scatterer does not change as the drill bit moves. Only the arrival times and relative amplitudes are changed as the near-drill bit source moves closer or farther from the scatterer.

Microseismic processing techniques may then be directly applied to locate and image the secondary source scatterers. If only a single component is recorded (e.g., using hydrophones), the three-dimensional location of scatterers may be ascertained by ray tracing from the progressive locations of the near-drill bit source activations to each one of a gridded volume of potential scattering centers. The location in the volume that most closely predicts the actual multichannel arrivals across the sensor array is taken to be location of the secondary source. After performing this operation for all chosen curved arrival families, a map of secondary sources emerges, highlighting the location of fractures in a volume surrounding the borehole.

When the drill bit itself acts as a continuous uncontrolled source, interferometry (e.g., comprising any one or more of relative phase comparison, cross-correlation, or deconvolution) can be used to develop an image of scatterers. Here, any sensor in the array, assumed fixed in place without loss of generality (e.g., a sensor in the middle of the array), is selected and the signal recorded by the selected sensor is used to cross-correlate or deconvolve the signals from each of the other sensors, as well as the selected sensor. In the event a pilot signal is measured at the drill string or platform, additional bandwidth and resolution may be attained using cross-correlation or deconvolution with the pilot signal prior to interferometry processing.

A secondary source location gives rise to a curved arc passing through time zero at the selected sensor location and tilted upwards or downwards with its opening towards the secondary source location. In order to locate the scattering source in three-dimensional space, P-wave and S-wave arcs corresponding to the secondary source scatterer are identified. As is the case with microseismic analysis, identification of the arcs permits determining the particle direction of the P-wave and to ray trace away from each sensor either for an amount of time determined by the P-wave, the S-wave time difference, or simply some selected range of times, to find the rays that best converge in the subsurface model. When sensors are employed in additional boreholes, triangulation can be used to further constrain the secondary source location estimate.

In the second unconventional method, instead of cross-correlating receivers to create impulsive curved arrivals, the raw received signals are propagated directly back into a three-dimensional volume grid (made up of individual cells) surrounding the borehole. The back-propagated energy arriving in each cell is accumulated (e.g., by using a sum-of-squares (RMS) over the time series, or an envelope), and scaled as needed to account for geometric spreading and limited aperture. Thus, in some embodiments, this process is comparable to exposing the film in a camera, such that the method is "photographic" in nature.

Scanning through the resulting intensity volume, areas of strong focus corresponding to the secondary sources created by fractures (and other scatterers) may be identified—either visually or algorithmically. In addition to accumulating data to form a "photograph" of scatterers, it may be useful to capture a movie of each individual time step, as the waves propagate. For a vibratory source (e.g., the drill bit), such a movie can be used to show extended pulsations proximate to and substantially centered upon the stationary secondary source locations. This animation is especially useful when the drill bit is a primary seismic source, as the bit will also create virtual images from reflection off of layered subsurface strata. These images will be moving in time as the drill bit moves along the borehole, unlike a scatterer image fixed in a single location.

Additional details for the implementation of each method will be given below. However, before explaining the operation of various embodiments further, some definitions will now be provided, as well as an introduction to time-reversal signal processing and time-reversal image processing.

For the purposes of this document, it should be noted that "elastic energy" can produce compressional (acoustic), shear, and seismoelectric signals.

"Electromagnetic energy" can originate with seismoelectric activity, where the seismoelectric generation leaves an imprint via its signature and spatial distribution.

The process of "interferometric comparison" includes any one or more of the processes of relative phase comparison, cross correlation, and deconvolution, between sets of data.

A "comparison" (e.g., an interferometric comparison) among some sensors in a sensor array may include comparing signals received by one sensor in the array with signals received by another sensor or group of sensors in the array, as well as comparing signals received by a first group of sensors in the array with signals received by a second group of sensors in the array.

"Scattered energy" includes reflected energy, transmitted energy, and/or diffracted energy.

"Time reversal signal processing" includes processing signals using wave equations that are invariant with the reversal of time, so that when a solution to a particular wave equation is found as a function of time t, the same function of −t is also a solution to the equation. This property is often termed "reciprocity", and the processing involved is well-known to those of ordinary skill in the art.

When a signal propagates from a source of elastic energy to a receiver, it is often modified by the material properties of the medium between the source and the receiver. This is true whether the source is an active source (e.g., drill bit, elastic transmitter, electromagnetic transmitter, etc.) or a passive source (e.g., a location that scatters energy impinging on it from another source). In a linear material medium, the received signal is a temporal convolution of the impulse response of the medium (where the impulse is at the source) with the transmitted signal. In the frequency domain, the received signal is the product of the transfer function of the medium (between the source and the receiver) with the Fourier transform of the transmitted signal.

For many types of waves, the response between the transmitter and receiver is substantially reciprocal, so that the transmitter and receiver can be interchanged without affecting the value of the received signal. Thus, It should be noted with respect to all of the examples given herein, by the property of reciprocity, the locations of the sources and receivers can be interchanged for operational convenience.

Normally, reciprocity is a useful assumption when losses can be neglected (in particular, when first order time derivatives are negligible). When the medium is both linear and reciprocal, it is possible to reconstruct the signal as it appeared at the source simply by time-reversing the received signal and filtering it with the impulse response of the system.

If the source signature is known, but the impulse response of the medium is not known, it is possible to produce an estimate of the impulse response, time-reverse the received signal, pass it through the estimated impulse response, compare the resulting signal with the source signature using an error metric (e.g., using a sum of squares of error), and iterate the estimated impulse response until the error metric result is below some desired minimum. More particularly, with an elastic wave or an electromagnetic wave, the impulse response is a function of the material properties between the source and the receiver, as well as the distance between the two. Hence, it is possible to locate the source using this technique when the source signature is known.

If the source signature is not known, but the signal from the source is observed at more than one location, it is possible to apply the same technique in an iterative fashion. That is, the technique can be applied to all estimated source locations, and the iterations can be terminated when the estimated source locations are within a specified error limit with respect to a selected receiver, and the estimated source signatures agree according to a specified criterion. This process may be called time-reversal image processing.

Hence, one way of locating a fracture is to monitor elastic emissions using a number of elastic transducers distributed along the borehole, and implementing the technique described for time-reversal image processing. Time-reversal image processing can be applied using elastic signals given off by a drill bit as the source, after scattering from fractures, or from the fractures themselves, operating as active elastic sources when they are initiated. That is, microseismic monitoring can use a combination of compressional and shear wave arrivals to ascertain the approximate direction from which the elastic signals originate. Hence fractures can be at least partially localized with a single transducer, and better localized with a transducer array.

The same technique can be applied for directly transmitted or scattered electromagnetic signals when the formation resistivity supports transmission and/or the source to receiver separation is small enough for the reciprocity approximation to be useful. The degree of departure from reciprocity that is acceptable will depend on how much error can be tolerated in locating the source. Typically, formations to be fractured are tight, with low fluid mobility, and a resistivity that is high enough to support a valid assumption of reciprocity.

When an elastic wave crosses a permeable interface and an ionic fluid is present, a seismoelectric wave is generated. This is a type of electromagnetic wave that arises due to differences in ion mobility across the interface as the elastic wave causes fluid motion. The boundaries defining a fracture can serve as such an interface. Hence, seismoelectric waves are often generated as an elastic wave crosses through a fracture. Once generated, these waves propagate as electromagnetic waves within the formation.

Seismoelectric waves can be detected as electromagnetic waves using magnetometers and/or electric field sensors. This makes it possible to perform time-reversal imaging based on measurements taken at a single location within a well bore. The measurements can be made using an elastic transducer and a magnetic transducer (and/or an electric field transducer) at the same location, such as in a borehole.

With the elastic transducer alone, the location of the fracture is not known using time-reversal signal processing unless the elastic source signature, along with the elastic impulse response of the medium is known. Similarly, the location of the fracture is not normally determined using time-reversal signal processing unless the electromagnetic impulse response of the medium is known. However, when both signal types (elastic and electromagnetic) are available, they can be handled together, in a manner similar to that which occurs when time-reversal image processing is applied to a single wave type and the medium properties are better known.

This can be accomplished by realizing that a fracture has a substantially unique location which is common to the models used in generating both the elastic and the electromagnetic impulse responses. Hence, an iterative procedure can be carried out with both signal types using time-reversal imaging, to infer a unique location for the fracture.

For example, when an observed elastic emission is due to the creation or movement of a fault, two sources of electromagnetic waves can be located. The first source is due to the seismoelectric effect, where it is likely that seismoelectric waves generated on both sides of a fault plane will create nearly canceling signals. The second source is due to the separation of charge that typically accompanies the creation or expansion of a fracture in a mineral body. This generates a time-varying dipole layer, which in turn generates an electromagnetic wave. This electromagnetic wave can thus be monitored at a single point, along with the elastic emission wave, and time-reversal signal processing applied to both, as described above, to obtain a unique location for the fault.

To test the implementation of this concept, the inventors constructed a mathematical model of the electromagnetic signal developed during the generation of a fracture. In order to minimize the cost of creating the model, it was assumed that a vertical fault is opened up between two locations along a borehole, that the fault extended to a specified distance radially from the borehole into the formation, and that the fault was approximated by a plane surface with a substantially uniform width.

A time signature for the opening of the fault was also assumed. In particular, it was assumed that the fault opened with a sinusoidal time dependence for one-half of a cycle of a characteristic time, then returned to its original position with a second sinusoidal time dependence over a period of one-half cycle. The second time interval provided an additional advantage in developing an understanding of the apparent dispersion of the wave. A more realistic model could have included the propagation velocity of the fracture, as well as a return to a different fault opening distance during the second half of the cycle.

In some of the testing, it was assumed that a fracture was generated in a roughly 32 cm diameter borehole located in a 10 ohm·m formation, and that the fracture extended 2 meters along the borehole and 20 meters radially into the formation from the borehole wall. It was further assumed that the fracture opened to a width of 1 millimeter, had a charge separation of 1 coulomb/m², and that the fracture took 10 milliseconds to open, returning to the unopened condition after 30 additional milliseconds.

The test results demonstrated that the electric field generated by fracture creation, as observed in the borehole, had a dominant component orthogonal to the plane of the fracture. It was also determined that the magnetic field generated by fracture creation, as observed in the borehole at the uppermost end of the fracture, had a dominant component along the borehole axis. A radial component parallel to the fracture plane might also be appreciable in some cases. The magnetic signature was quite different from the electric signature, because the magnetic field was generated by the motion of charge, and hence approximately proportional to the time derivative of the electric field.

The electric field signal was observed to attenuate rapidly with distance, but the overall shape of the signal did not change in a noticeable manner. At a range of 100 meters, the electric field signal might be difficult to observe, with an attenuated signal strength on the order of a few nanovolts.

The apparent group velocity of the electric field was plotted as a function of distance from the closest end of the fracture. This was calculated by tracking the location in the peak signal amplitude vs. time and distance. Since the source was a distributed source, geometric effects also contributed to the moveout of the waveforms. That is, the apparent group velocity is a function of distance. At lower resistivities, or at greater distances, dispersion increases.

The apparent group velocity of the magnetic field component was also plotted, as two values: a first, high frequency portion of the magnetic signal, and a lower frequency, positive-going portion of the waveform. As before, part of the variation in wave speed was found to be due to geometric effects, and part of it was due the frequency-dependent loss resulting from formation conductivity.

As part of the testing, it was also determined that formation conductivity has a significant effect on attenuation and on dispersion. When formations have low resistivity (e.g., a formation with conductivity on the order of 1 ohm·m), signals propagate with speeds similar to the speed of sound, and moveout can be included advantageously in the time-reversal analysis. However, when the formation resistivity is substantially greater (e.g., a thousand times greater), the wave speed is close to that of light in a vacuum. In that case, the incorporation of moveout correction is not as useful.

The test results also indicated that in some embodiments, a pair of electric field antennas with maximum sensitivities in directions orthogonal to the borehole axis and to each other can be used to determine the orientation of the fracture within the borehole relative to the instrument package (e.g., a downhole tool). This is because the electric field has a significant component in a direction orthogonal to the fracture plane. Hence, in the case of a fracture along the borehole, the direction of the observed cross-axial electric field (irrespective of magnitude) will be orthogonal to the fracture plane. If fractures not falling along the borehole axis are of interest, then three electric field antennas can be utilized, with three axes of sensitivity that are orthogonal to each other. In this case, at any instant of time during a fracturing event, the direction of the electric field will be orthogonal to the fracture plane.

Similarly, two or three orthogonal magnetic field components can be measured. As observed in the borehole, the direction of the magnetic field will likely lie in the plane of the fracture and orthogonal to the axis defining the largest extent of the fracture. The orientation of the magnetic field vector depends on the geometry of the fracture. For the simple example making up the test described herein, the orientation depends mostly on the length and width of the fracture.

The methods described thus far have been applied to measurements made at a single location within a borehole. Since the received signal strength tends to fall off rapidly with distance from the fracture, it may be advantageous to provide instrumentation at a plurality of depths along the borehole. The signals from sensors at a variety of locations can be processed individually or simultaneously, using the same time-reversal imaging technique.

In some embodiments, it can be useful to identify a time window in the observed data in which to search for signals from fractures. In the case of a controlled source, the time is easily determined with reference to the triggering of the source. If the source is an uncontrolled source (e.g., when the source is a drill bit), or the signals to be analyzed are due to the spontaneous generation of fractures, then the data series provided by the sensor suite should be monitored continually for events which exceed a pre-determined threshold, so that the data in pre-defined time windows around this threshold can be located and analyzed. Additionally, events may be identified using a pre-determined signature that is expected to resemble the signatures of the elastic and/or electromagnetic events to be analyzed.

FIG. 1 is a functional block diagram illustrating apparatus 100 and methods according to various embodiments of the invention. In this case, a technique for using substantially simultaneous measurements from an elastic sensor and an electromagnetic sensor at the same location within the bore (or even separated by a relatively small distance) can be used to infer the location of a fracture. This apparatus 100 is useful in situations where the formation resistivity is not so high that the arrival time of the electromagnetic signal is essentially independent of the source location.

For convenience, the electromagnetic sensor 102 to receive the electromagnetic signal is shown as an inductor (representing a magnetic pickup); signals can also be received using a loop, electric dipole, or electric monopole antenna, for example. Thus, the electromagnetic sensor 102 may comprise one or more magnetic field sensors, one or more electric field sensors, or any number and combination of these. Similarly, as a matter of convenience, while only a single electromagnetic sensor 102 and elastic sensor 104 are shown; any number of such sensors 102, 104 may be used in an array of two or more sensors 102, 104. An individual array may comprise one or more sensor types (e.g., array 302 in FIG. 3).

It is assumed that the sampling rate of the elastic 106 and electromagnetic 108 signals is sufficiently high that samples can effectively be matched point by point in time. After the elastic and electromagnetic signals 106, 108 are acquired and converted to digital format, and after a time interval of interest has been identified, the data in that time interval can be reversed over time for both the elastic and electromagnetic digitized data sequences.

As a simple example, suppose that only the source location and signature are unknown. That is, the P-wave and/or S-wave speeds are known (or rock properties allowing the calculation of these wave speeds are known), and the formation resistivity is also known along the path traveled by the incoming electromagnetic and elastic waves.

The arrival time of a signal depends on the location of the source of that signal. With only the knowledge given, and a single sensor at a single location, it is not possible to determine the source location. However, with two sensors at the same location responding to different types of waves (as shown in FIG. 1), it is possible to determine the source location. Strictly speaking, the sensors need not be at precisely the same location, but if they are positioned at significantly different locations, the analysis is more complicated, as will be realized by those of ordinary skill in the art.

In the example of FIG. 1, three or more possible source locations are specified. The initial values of these three (or more) locations are set sufficiently far apart to encompass the entire range over which it should be possible to observe signals, perhaps according to a minimum expected signal strength. Each of these three values is entered into an elastic formation model and into an electromagnetic formation model, along with the time-reversed elastic and time-reversed electromagnetic data so as to produce three estimates of the elastic signature at the source and three estimates of the electromagnetic signature at the source.

The three estimates of the elastic signature of the source are then used to make three additional estimates of the electromagnetic signature of the source. As a first approximation, an electric field signature from the initiation of a fracture will be a scaled copy of the P-wave elastic signature at the source, whereas a magnetic field signature from the initiation of a fracture will be a scaled copy of the time derivative of the P-wave elastic signature at the source.

In the next stage of the analysis, a pair-wise comparison is made between each of the electric field signatures derived from the elastic signatures and each of the electric field signatures derived by synthetically passing the time-reversed observed electromagnetic signature through the formation. The comparison can be carried out by convolving the signals pair-wise, or by making a least squares fit, pair-wise of a scaled version of each of the electromagnetic signatures derived from the elastic signature to its corresponding signature derived from the observed electromagnetic signal, which may comprise electric and magnetic field components, each measured separately. For the purposes of this document, an "electromagnetic signature" may comprise a waveform acquired with an electric field sensor, a magnetic field sensor, or some combination of both.

If the convolution technique is used, three convolution signals are developed as shown in the following equation:

$$C_i(t_j) = \sum_{k=1}^{N} EA_i(t_j - t_k) * ER_i(t_k),$$

where i ranges from 1 to at least 3 (i.e. the number of spacings originally estimated), the data samples are taken at times $t_j$ for j=1 to N, where N is the total number of data samples (preferably the same number for each of the values of i), $EA_i(t_j)$ is the electromagnetic signature derived from elastic signature i at time j, and $ER_i(t_k)$ is the electromagnetic signature obtained by filtering the time reversed electromagnetic signature through the formation with the spacing estimate i.

If the two signatures are identical within a scale factor, the peak of the convolution filter should occur in the center of the time interval of the convolution. Defining the locations of the peaks of the convolutions as $P_i$, the two values of $P_i$ that are closest to the center of the convolution interval are then selected for the iteration.

If the least squares technique is used, then the following terms may be calculated for each of the i candidate source spacings, according to the following equation:

$$x_i = \sum_{m=1}^{N} ER_i(t_m)^2 - \frac{\left(\sum_{m=1}^{N} ER_i(t_k) * EA_i(t_k)\right)^2}{\sum_{m=1}^{N} EA_i(t_k)^2}.$$

In this case, the two smallest values of $X_i$ are selected for the iteration.

At this point in the process, a test comparison 110 can be made to see if the two peak locations differ by less than a pre-determined accuracy criterion (e.g., a percentage of the magnitude of one location or the other). If they do, then the iteration may be terminated. Otherwise, the average time of the two most closely-matched intervals can be calculated so as to form a third time, and these three values may be used at block 114 as the specified distances, with the process iterated until either a specified number of iterations have been completed (without successfully meeting the acceptance criterion), or the acceptance criterion is met.

Figure 2:
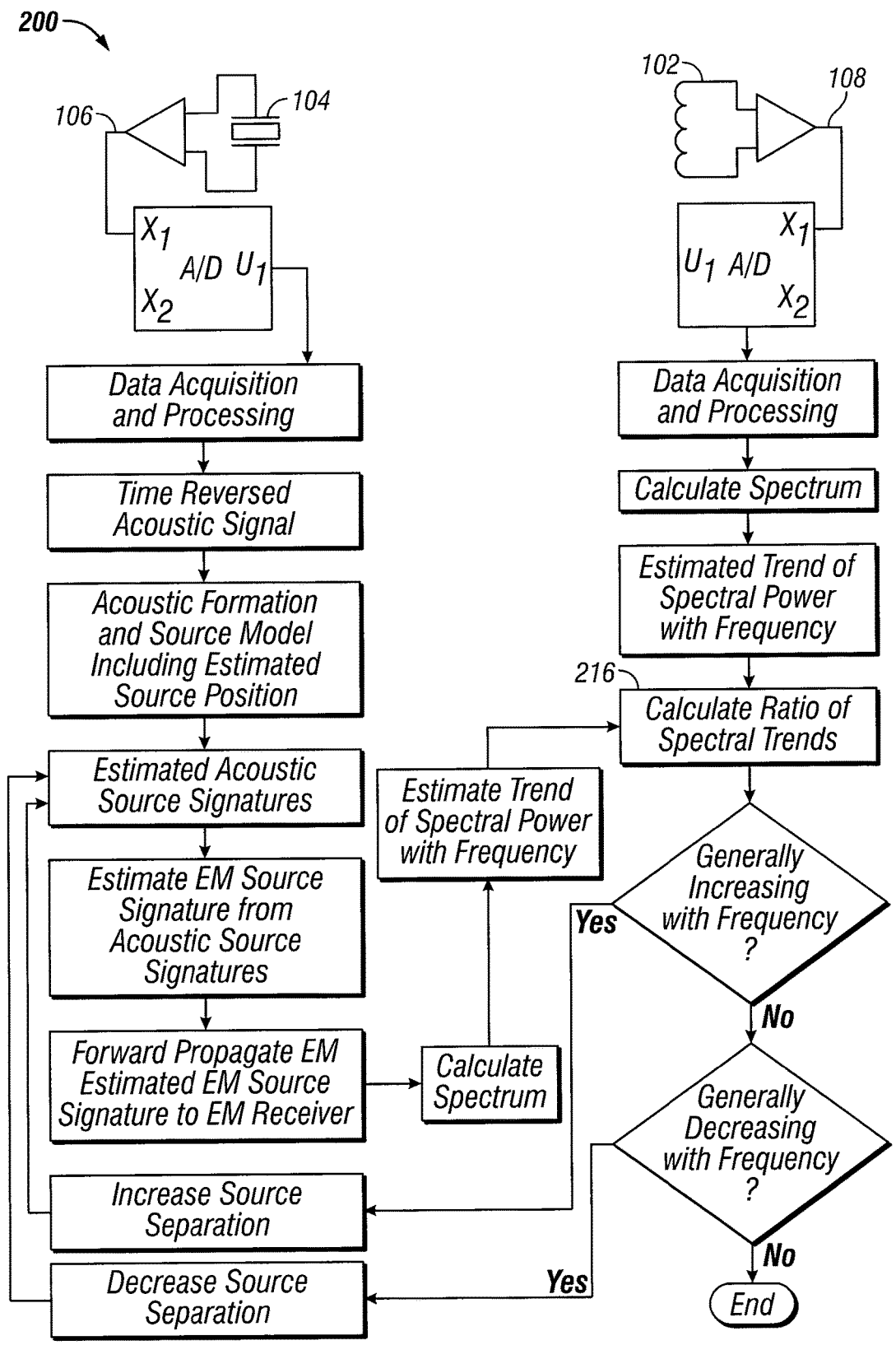
FIG. 2 is another functional block diagram illustrating apparatus and methods according to various embodiments of the invention.

FIG. 2 is another functional block diagram illustrating apparatus 200 and methods according to various embodiments of the invention. In this case, a technique for using substantially simultaneous measurements from an elastic sensor 104 and an electromagnetic sensor 102 at the same location within the bore (or separated by a relatively small distance) to infer the location of a fracture is presented. In this case, the process shown is applied when the formation resistivity is high enough that the arrival time of the electromagnetic signal is essentially independent of the source location (i.e., where a timing moveout analysis of the electromagnetic signal is difficult or impossible). This process uses a combination of time-reversed elastic modeling along with forward electromagnetic modeling, assuming that only the source location is unknown. However, the technique can be expanded to determine the extent of the source and estimates of formation parameters.

As with the technique of FIG. 1, this process can begin with observing time-tagged samples from the magnetic (and/or electric) and elastic field sensors 102, 104. An event of interest is identified, as described previously, and the elastic waveform is time-reversed in the chosen time window surrounding the event and synthetically propagated through the formation to the hypothesized source location, where a candidate source signature is estimated.

Again, as in FIG. 1, the estimated elastic signature at the source is used to estimate the electromagnetic signature at the source. The estimated electromagnetic signature is then synthetically propagated to the observation location. Afterward, the frequency spectra of the observed electromagnetic signal and of the synthetic electromagnetic signal are calculated and both are filtered with the same filter so as to remove rapid variations in spectral magnitude with frequency.

After this, at each frequency within the filtered spectra, the ratio of the synthetic spectrum to the observed spectrum is calculated, and a test is applied at block 216 to determine if, within a specified tolerance, the ratio is an increasing function of the frequency, relatively flat with frequency, or a decreasing function of the frequency.

If increasing, it is assumed that the estimated source location is too close to the receiver location, and the estimated source location is moved further away by a pre-specified amount.

If decreasing, the opposite action is taken: the source location is moved closer to the receiver location by a pre-specified amount. The amount of change at each step in the iteration can be a function of the number of iterations.

In the intermediate case, where the two spectra appear to be similar (i.e., substantially flat with frequency), the iteration process is terminated and the latest estimate of the source distance is used.

If the geometric extent of the fracture is to be estimated, a least squares technique can be applied in addition to the spectral technique to iteratively determine the extent of the fracture. This would be carried out in a manner similar to that described with respect to FIG. 1. The least squares technique can also be used in conjunction with the processes of FIGS. 1 and 2 to estimate the formation parameters existing between the source and the sensors 102, 104. Still further embodiments may be realized.

Figure 3:
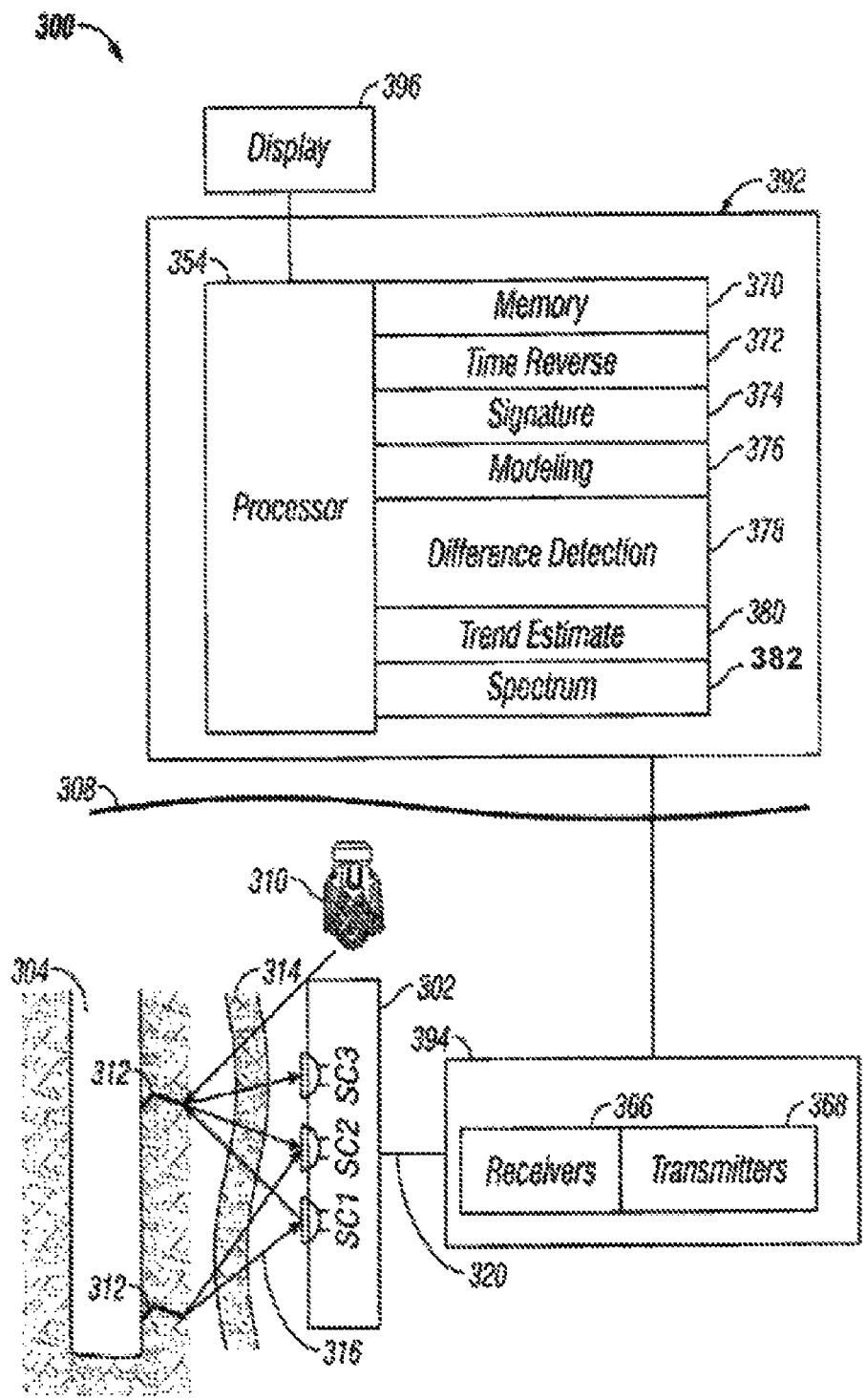
FIG. 3 is a block diagram illustrating apparatus according to various embodiments of the invention.

For example, FIG. 3 is a block diagram illustrating apparatus 300 according to various embodiments of the invention. Here it can be seen that the apparatus 300 may comprise a number of components, including a logging facility 392.

The logging facility 392, shown located above the surface 308, may comprise a processing module 354 and a memory 370 coupled to the processing module 354. The memory 370 may be used to store instructions which, when executed, result in the apparatus 300 accomplishing any of the methodologies described herein.

The apparatus 300 may also comprise a housing 394, such as a down hole tool or tool body that is attached to and includes any one or more of the components shown in FIGS. 1-3, including those of apparatus 100, 200 of FIGS. 1-2. Thus, the apparatus 300 can form part of a subsurface exploration system, with a down hole tool used to house various components of the apparatus 300. The housing 394 may therefore be attached to an array 302 of one or more elastic energy sources and/or one or more sensors (e.g., SC1, SC2, SC3, comprising antennas, elastic transducers, elastic sensors, and/or electromagnetic (i.e., electric and/or magnetic) sensors). One or more receivers 366 and transmitters 368 may be used to receive/amplify received signals from the sensors SC1, SC2, SC3 and/or to drive sources SC1, SC2, SC3.

In some embodiments, any one or more components of the logging facility 392 may be located below the surface 308, perhaps included within the housing 394. In some embodiments, a drill bit 310 may serve as a source of elastic energy.

The facility 392 may also comprise a receiver and/or transmitter (not shown) to receive and transmit commands and data to the housing 394, and components located therein. A display 396 may be used to display a variety of information, include the location of discontinuous features 312, such as fractures, with respect to a borehole 304 in a formation 314. Thus, many embodiments can be realized.

For example, in some embodiments, apparatus 300 may comprise a multi-channel sensor array 302 and a processing module 354. Thus, an apparatus 300 may comprise a multi-channel sensor array 302 to receive radiated energy as scattered energy 316 after interaction with a geologic formation 314, the interaction to include at least partial seismoelectric or electroseismic conversion between elastic and electromagnetic energy, wherein the sensor array 302 is to transform the scattered energy 316 into received signals 320.

The apparatus 300 may further comprise a processing module 354 to identify discontinuous features 312 in the geologic formation 314 by interferometric comparison of the received signals as elastic signals and/or electromagnetic signals among some sensors SC1, SC2, SC3 in the sensor array 302, or by time-reversal propagation of the received signals as elastic signals and/or electromagnetic signals in a numeric model of a volume of the geologic formation 314.

The apparatus 300 may include different types of sensors SC1, SC2, SC3. Thus, the sensor array 302 may comprise one or more elastic sensors, and one or more electromagnetic sensors.

The apparatus 300 may include the same type of sensors. Thus, the sensor array 302 may comprise orthogonal electric field antennas as sensors SC1, SC2, SC3. Multiple magnetic field sensors may also be used, exclusively, or in combination with one or more electric field sensors.

A time-reversal module 372 can be used to propagate received signals back into a numerical model of a geologic formation associated with the received signals. Thus, the processing module 354 may comprise, or be coupled to a time-reversal module 372 to process the received signals in reverse time order to propagate the received signals back into the numerical model of the geologic formation 314.

The apparatus 300 may include a signature estimation module 374. In some cases, the source is well-understood, and can be modeled by synthesizing its signature, or possibly replaying its signature from a recorded signal. Thus, the processing module 354 may comprise, or be coupled to a signature estimation module 374 to estimate signatures associated with the received signals and an elastic source signature or a seismoelectric source signature.

The apparatus 300 may include a modeling module 376. Thus, the processing module 354 may comprise, or be coupled to a modeling module 376 to provide a model of propagation associated with the source of the radiated energy within the model of the geologic formation 314.

The elastic-derived electromagnetic signature may be tied to a hypothetical conversion location, so that the actual recorded electromagnetic signal is back-propagated to that location, to be compared to the elastic-derived electromagnetic signature. A range of hypothetical conversion locations can then be searched in a systematic fashion, to choose the one that is closest to the actual recorded electromagnetic signal as the estimated conversion location. The seismoelectric signal can also be forward-modeled using a hypothetical conversion location, and compared with the directly recorded electromagnetic signal. Thus, the processing module 354 may comprise, or be coupled to a difference detection module 378 to determine when peak locations associated with an elastic-derived electromagnetic signature associated with the elastic signals and a filtered, time-reversed electromagnetic signature associated with the electromagnetic signals differ by less than a selected amount, providing an indication of when iterating the target distance specification can be terminated.

A trend estimation module 380 may be included in the apparatus 300. Thus, the processing module 354 may comprise, or be coupled to a trend estimation module 380 to estimate a trend of spectral power with frequency of a spectrum associated with the electromagnetic signals or with frequency of a spectrum associated with an estimated electromagnetic source signature derived from estimated elastic signal signatures. In some embodiments, the processing module 354 may comprise, or be coupled to a spectrum calculation module 382 to calculate the spectrum of the received signals or the spectrum of a forward-propagated, estimated electroseismic source signature.

A drill bit 310, among other things, can be used to generate the radiated energy (e.g., using compressional and/or shear wave energy). Therefore, the apparatus 300 may operate using a drill bit 310 to generate the radiated energy upon rotation within the geologic formation 314. Still further embodiments may be realized.

Figure 4:
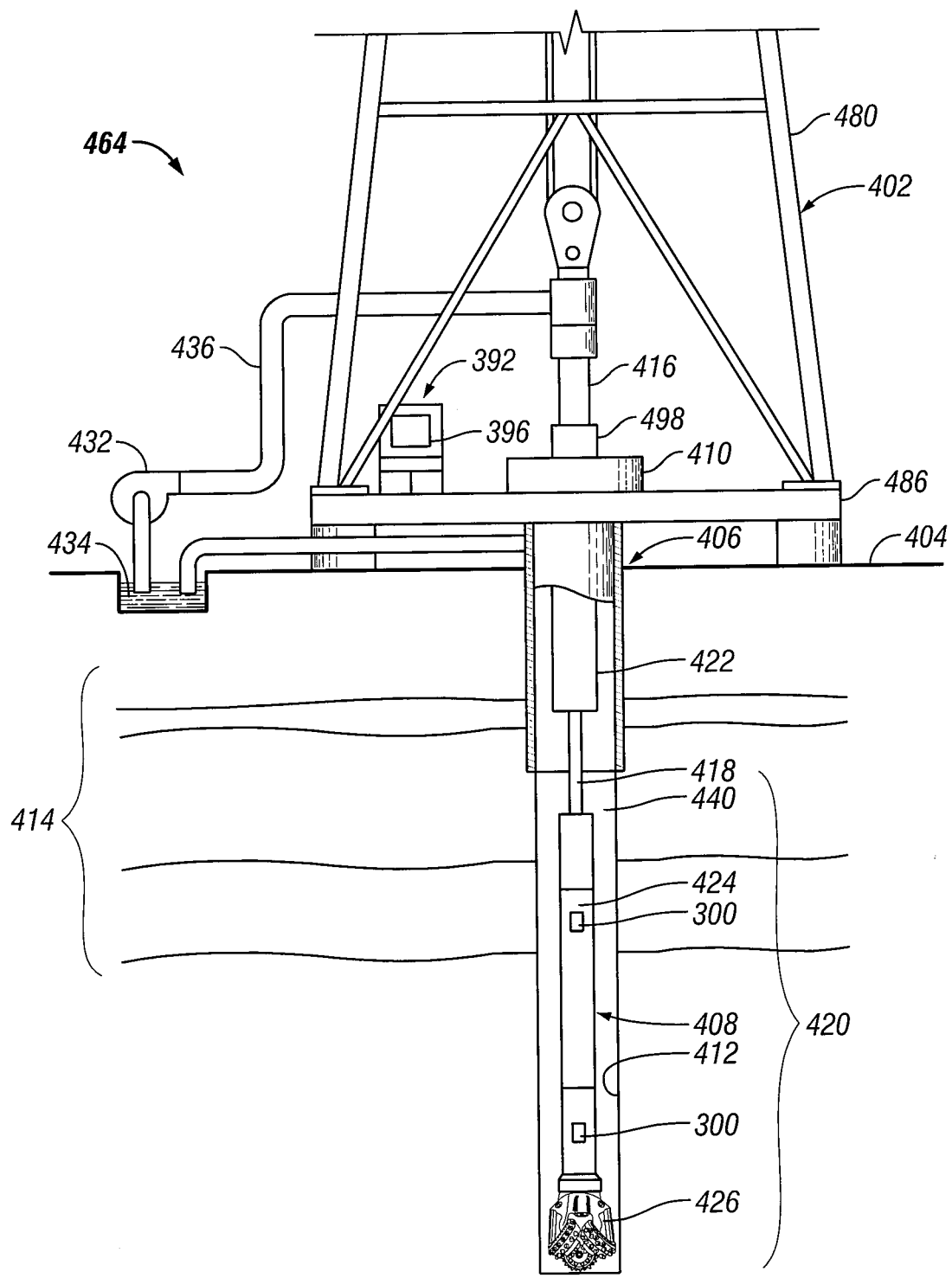
FIGS. 4-5 illustrate additional system embodiments of the invention.
Figure 5:
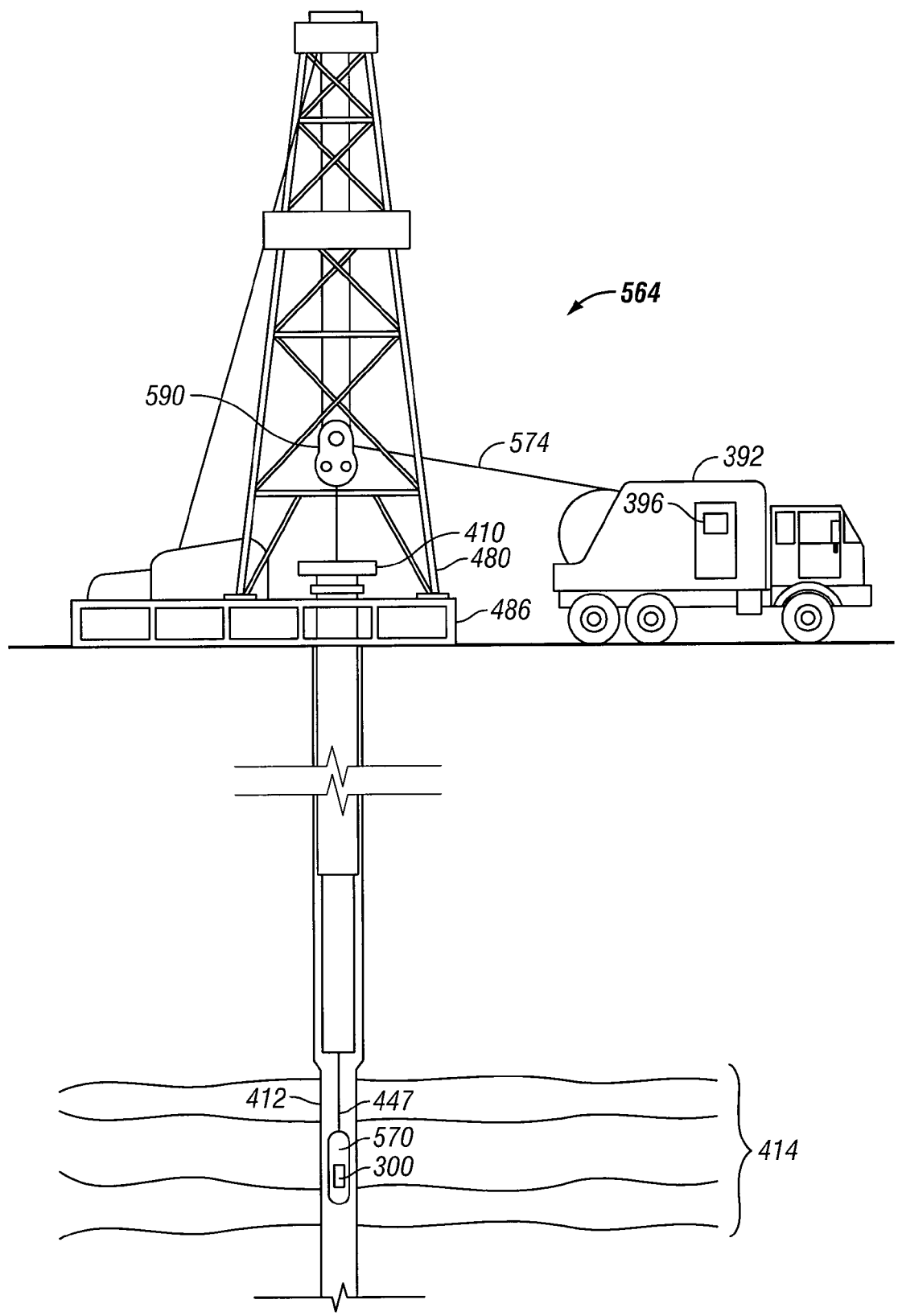

For example, FIGS. 4-5 illustrate system embodiments of the invention. FIG. 4 illustrates a drilling rig system 464 embodiment of the invention, and FIG. 5 illustrates a wireline system 564 embodiment of the invention. Thus, systems 464, 564 may comprise portions of a downhole tool, realized as a tool body 570 (e.g., as part of a wireline logging operation), or as a measurement while drilling (MWD) or logging while drilling (LWD) tool 424 as part of a downhole drilling operation.

The apparatus 300, which may comprise any one or more of the components previously described, may be located downhole. The apparatus 300, including any of the subcomponents previously described, may thus be at least partially housed by a downhole tool, perhaps taking the form of an MWD/LWD tool 424 or a tool body 570.

In some embodiments, portions of the apparatus 300, including the processing module 354, may be located at the surface. Other portions of the apparatus 300 may be at least partially housed by the downhole tool. Telemetry may be used to communicate between portions located downhole, and portions located at the surface.

The processing module 354 may comprise a signal processor. The signal processor may be used to receive and digitize the received signals (e.g., provided by the sensors of FIGS. 1-3) to provide a digitized output signal.

The processing module 354 may comprise a telemetry transmitter to communicate values associated with output signals from the apparatus 300 to a surface logging facility 392, perhaps one that includes a signal processor. Thus, the surface logging facility 392 and the acquisition and processing electronics may be used to divide the labor employed in processing the signals provided by the apparatus 300. The surface facility 392 may comprise a display (see element 396 of FIGS. 4-5) to display values associated with the output signal, such as a digitized version of the output signal of the apparatus 300, as well as images of discontinuities that have been located in the formation. Thus, many embodiments may be realized.

Drilling of oil and gas wells is commonly carried out using a string of drill pipes connected together so as to form a drilling string that is lowered through a rotary table 410 into a wellbore or borehole 412. Turning now to FIG. 4, it can be seen how a system 464 may comprise a portion of a drilling rig 402 located at the surface 404 of a well 406. The drilling rig 402 may provide support for a drill string 408. The drill string 408 may operate to penetrate a rotary table 410 for drilling a borehole 412 through subsurface formations 414. The drill string 408 may include a Kelly 416, drill pipe 418, and a bottom hole assembly 420, perhaps located at the lower portion of the drill pipe 418. In some embodiments, apparatus 300 may be carried as part of the drill string 408 or the tool 424.

The bottom hole assembly 420 may include drill collars 422, a tool 424, and a drill bit 426 (similar to or identical to the drill bit 310 of FIG. 3). The drill bit 426 may operate to create a borehole 412 by penetrating the surface 404 and subsurface formations 414. The tool 424 may comprise any of a number of different types of downhole tools including MWD (measurement while drilling) tools, LWD tools, and others.

During drilling operations, the drill string 408 (perhaps including the Kelly 416, the drill pipe 418, and the bottom hole assembly 420) may be rotated by the rotary table 410. In addition to, or alternatively, the bottom hole assembly 420 may also be rotated by a motor (e.g., a mud motor) that is located downhole. The drill collars 422 may be used to add weight to the drill bit 426. The drill collars 422 may also operate to stiffen the bottom hole assembly 420, allowing the bottom hole assembly 420 to transfer the added weight to the drill bit 426, and in turn, to assist the drill bit 426 in penetrating the surface 404 and subsurface formations 414.

During drilling operations, a mud pump 432 may pump drilling fluid (sometimes known by those of skill in the art as "drilling mud") from a mud pit 434 through a hose 436 into the drill pipe 418 and down to the drill bit 426. The drilling fluid can flow out from the drill bit 426 and be returned to the surface 404 through an annular area 440 between the drill pipe 418 and the sides of the borehole 412. The drilling fluid may then be returned to the mud pit 434, where such fluid is filtered. In some embodiments, the drilling fluid can be used to cool the drill bit 426, as well as to provide lubrication for the drill bit 426 during drilling operations. Additionally, the drilling fluid may be used to remove subsurface formation 414 cuttings created by operating the drill bit 426.

FIG. 5 shows a well during wireline logging operations. A drilling platform 486 is equipped with a derrick 480 that supports a hoist 590. Here it is assumed that the drilling string has been temporarily removed from the borehole 412 to allow a wireline logging tool body 570, such as a probe or sonde that carries a sonic tool, to be lowered by wireline or logging cable 574 into the borehole 412. Typically, the tool body 570 is lowered to the bottom of the region of interest and subsequently pulled upward at a substantially constant speed.

During the upward trip, an apparatus 300 included in the tool body 570 may be used to perform measurements in the borehole 412 as the tool body 570 passes by. The measurement data can be communicated to a surface logging facility 392 for storage, processing, and analysis. The logging facility 392 may be provided with electronic equipment for various types of signal processing, which may be implemented by any one or more of the components of the apparatus 300 claimed as an apparatus or a system in the claims below, and/or shown in FIGS. 1-4. The log data is similar to that which may be gathered and analyzed during drilling operations (e.g., during logging while drilling (LWD) operations). Thus, additional embodiments may be realized.

For example, a system 464, 564 may comprise a down hole tool (e.g., tool 424 or tool body 570) and one or more apparatus 300. The system 464, 564 can be implemented using a wireline or MWD tool. The system 464, 564 may further comprise a drill bit 426 to generate radiated energy upon rotation within the geologic formation 414.

The apparatus 100, 200, 300; sensors 102, 104; drill bits 310, 426; modules 370-382; facility 392; display 396; drilling rig 402; well 406; drill string 408; rotary table 410; boreholes 412; formation 414; Kelly 416; drill pipe 418; bottom hole assembly 420; drill collars 422; downhole tool 424; mud pump 432; mud pit 434; hose 436 systems 464, 564; drilling platform 486; derrick 480; hoist 490; tool body 570, and logging cable 574 may all be characterized as "modules" herein. Such modules may include hardware circuitry, and/or a processor and/or memory circuits, software program modules and objects, and/or firmware, and combinations thereof, as desired by the architect of the apparatus 300 and systems 464, 564, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 300 and systems 464, 564 are intended to provide a general understanding of the structure of various embodiments, and they are not intended to serve as a complete description of all the elements and features of apparatus and systems that might make use of the structures described herein.

Applications that may incorporate the novel apparatus and systems of various embodiments include a variety of electronic systems, such as televisions, cellular telephones, personal computers, workstations, radios, video players, vehicles, and location technology (e.g., GPS (Global Positioning System) location technology), signal processing for geothermal tools and smart transducer interface node telemetry systems, among others. Some embodiments include a number of methods.

Figure 6:
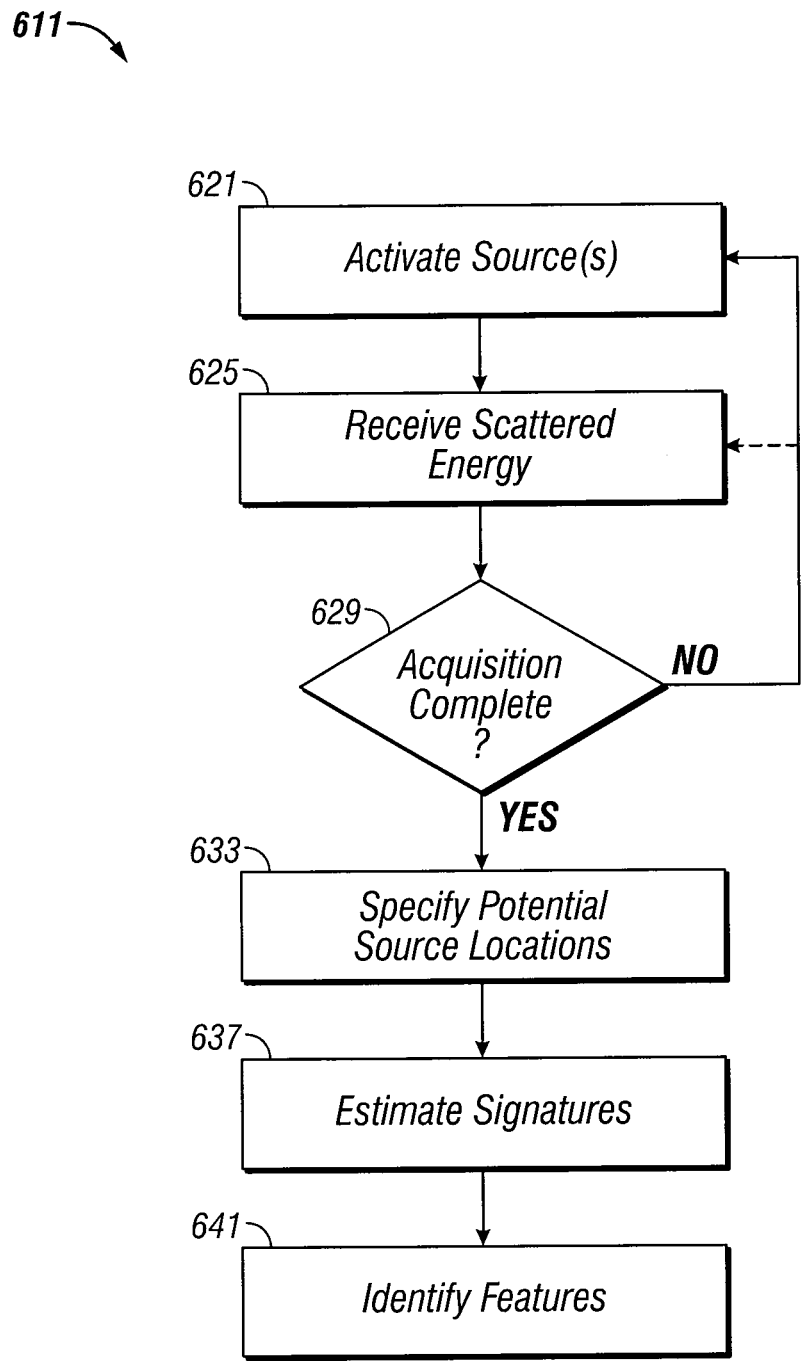
FIG. 6 is a flow diagram illustrating several methods according to various embodiments of the invention.

FIG. 6 is a flow diagram illustrating several methods 611 according to various embodiments of the invention. For example, a processor-implemented method 611 to execute on one or more processors that perform the method to locate fractures in a geologic formation may begin at block 621. The activity at block 621 may include activating a sub-surface source of elastic energy within the geologic formation by fracturing some portion of the formation, by the spontaneous initiation of a fracture, or by rotating a drill bit in the geologic formation, among other mechanisms.

The existence of a three-dimensional well bore (e.g., a multilateral well) may be useful in some embodiments, because it permits viewing sub-surface features via triangulation, where sensors in an array disposed in the well bore are not just in one plane, as they might be with a two-dimensional displacement of the well bore. Thus, the activity at block 621 may include drilling a multilateral well bore, wherein the drilling is included in the activation, and wherein the sensor array is disposed in the well bore.

The method 611 may continue on to block 625, to include receiving radiated energy from the activated source as scattered energy after the radiated energy interacts with the geologic formation. The scattered energy can be received at a sub-surface multi-channel sensor array, for example, that operates to transform the scattered energy into received signals. The radiated energy can be provided by a sub-surface source of elastic energy, such as fracture initiation, a rotating drill bit, etc.

If the acquisition of scattered energy information is complete, as determined at block 629, the method 611 may continue on to block 633. Otherwise, the method 611 may return to either of blocks 621 or 625.

At block 633, a range of potential distances to the source may be specified. Thus, the activity at block 633 may comprise iteratively specifying at least three potential locations of the sub-surface source.

The method 611 may continue on to block 637 with estimating signatures. For example, electromagnetic source signatures may be estimated from elastic signatures, which are in turn estimated from the received signals. Thus, the activity at block 637 may comprise estimating first electromagnetic signatures from elastic source signatures determined directly from the received signals.

Electromagnetic source signatures can also be estimated directly from the signals that are received by the sensor array. Thus, the activity at block 637 may comprise estimating second electromagnetic signatures directly from the received signals.

Elastic signatures can be estimated from the received signals, as well. Thus, the activity at block 637 may comprise estimating elastic signatures directly from the received signals, using an elastic formation model, a source model, and at least one estimated source location of the sub-surface source.

Electromagnetic signatures can be generated using both elastic and electroseismic signal data: seismoelectric signals are present when elastic waves generate electromagnetic waves, electroseismic signals are present when electromagnetic waves generate elastic waves, perhaps via the piezoelectric effect and/or magnetostriction. Thus, the activity at block 637 may also include estimating an elastic-derived electromagnetic signature associated with the elastic signals and a filtered, time-reversed electromagnetic signature associated with the electromagnetic signals.

The method 611 may go on to block 641 to include identifying discontinuous features in the geologic formation by interferometric comparison of the received signals as elastic signals and/or electromagnetic signals among some sensors in the sensor array, or by time-reversal propagation of the received signals as elastic and/or electromagnetic signals in a numeric model of a volume of the geologic formation.

As noted previously, two different derivations of electromagnetic signatures can be compared to improve an estimate of the locations of the discontinuities (which may be sources in and of themselves). There are several ways of making the comparison. The sum of squares of error between the seismoelectric signature as predicted from the elastic signature and the observed electromagnetic signature should be minimized when the assumed geological structure on which the seismic model is based matches the geological structure responsible for the observed electromagnetic signal.

Alternatively, or in addition, cross-correlation between the seismoelectric signal as predicted from the elastic signal and the observed seismoelectric signal can be calculated. Various normalizations are often applied to such analyses. With this or several similar measures, the center of the distribution can be designated as a peak, and the distribution of the cross-corelation results should be symmetric about the peak. This cross-correlation result can be compared with the autocorrelation of the observed electromagnetic signal. Greater credence can be given to the comparison in frequency ranges that exhibit a greater degree of coherence between the two signals, i.e., between the observed electromagnetic signal and the electromagnetic signal derived from the seismic signal and formation model.

Thus, the activity at block 641 may comprise comparing the first electromagnetic signatures with the second electromagnetic signatures via convolution or a least-squares fit to improve an estimate of locations of the discontinuous features comprising the sub-surface source.

The trends of spectral power with frequency can be estimated for both the elastic signals and the electroseismic signals. Thus, the activity at block 641 may comprise estimating a trend of spectral power with the frequency of a spectrum associated with the electromagnetic signals and with the frequency of a spectrum associated with an estimated electromagnetic source signature, the estimated electromagnetic source signature derived from estimated elastic signal signatures.

The ratio of the spectral trends can be calculated to determine their relationship to frequency, and used to continue or stop iterative adjustment of estimated source separation. Thus, the activity at block 641 may comprise calculating a spectral trends ratio of the trend of spectral power with the frequency of the spectrum associated with the electromagnetic signals and the trend of spectral power with the frequency of the spectrum associated with the estimated electromagnetic source signature derived from the estimated elastic signal signatures. Further activity may comprise iterating the ratio calculation after adjusting the separation of the sources of the radiated energy until the ratio varies with frequency by less than a selected amount.

The ratio of spectral trends associated with the elastic and seismoelectric signals can be used to determine whether the estimated locations of the sources should be increased, or decreased. Thus, the activity at block 641 may also comprise adjusting source separation based on the spectral trends ratio.

It should be noted that the methods described herein do not have to be executed in the order described, or in any particular order. Moreover, various activities described with respect to the methods identified herein can be executed in iterative, serial, or parallel fashion. Some activities described for one method may be added to another, and some of the included activities may be left out. Information, including parameters, commands, operands, and other data, can be sent and received in the form of one or more carrier waves.

Figure 7:
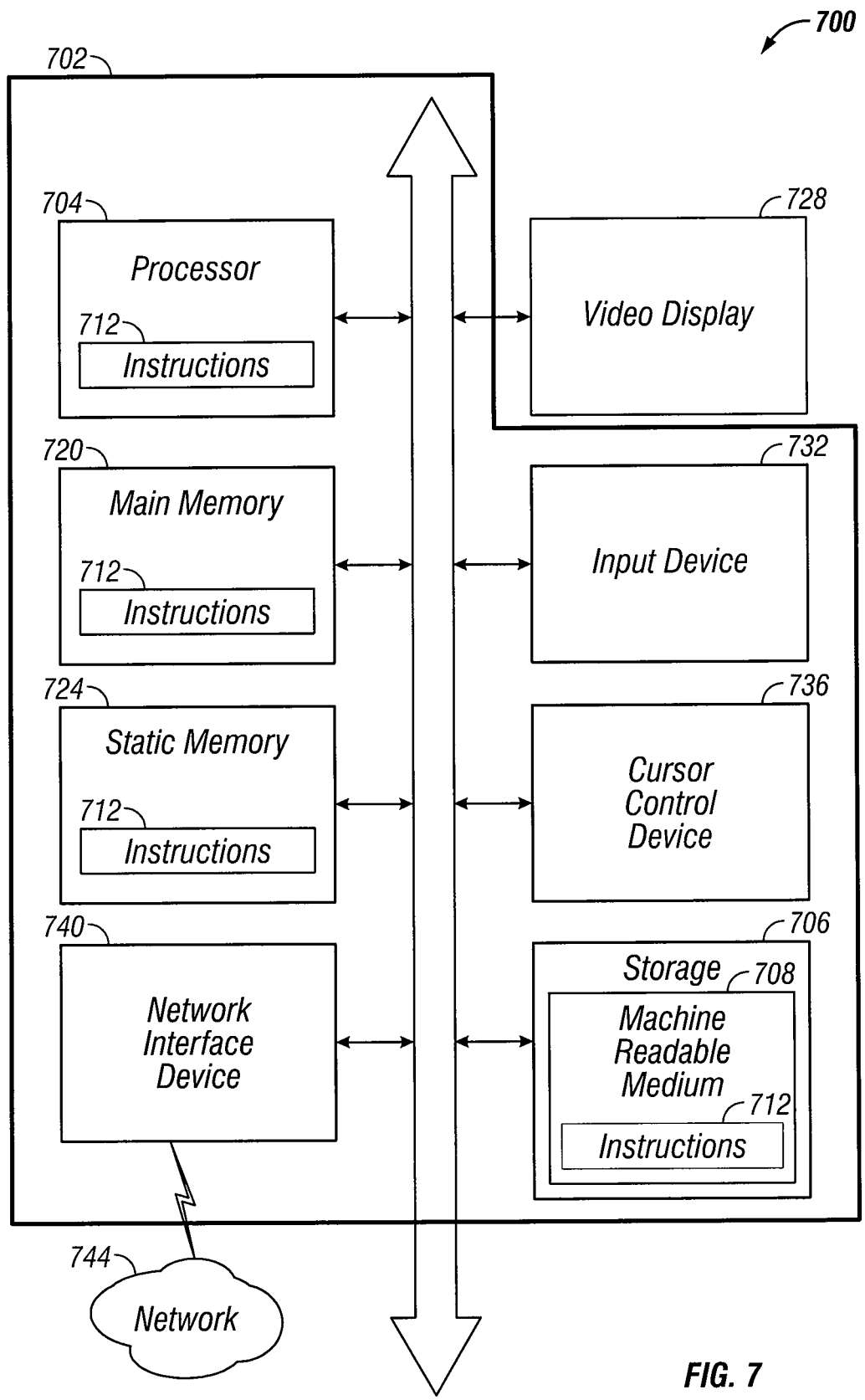
FIG. 7 is a block diagram of an article according to various embodiments of the invention.

FIG. 7 is a block diagram of an article 700 of manufacture, including a specific machine 702, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 700 of manufacture, such as a computer, a memory system, a magnetic or optical disk, some other storage device, and/or any type of electronic device or system may include one or more processors 704 coupled to a machine-readable medium 708 such as a memory (e.g., removable storage media, as well as any memory including an electrical, optical, or electromagnetic conductor comprising tangible media) having instructions 712 stored thereon (e.g., computer program instructions), which when executed by the one or more processors 704 result in the machine 702 performing any of the actions described with respect to the processes or methods described above.

The machine 702 may take the form of a specific computer system having a processor 704 coupled to a number of components directly, and/or using a bus 716. Thus, the machine 702 may be similar to or identical to the apparatus 300 in FIG. 3, or the logging facility 392 shown in FIGS. 3-5.

Turning now to FIG. 7, it can be seen that the components of the machine 702 may include main memory 720, static or non-volatile memory 724, and mass storage 706. Other components coupled to the processor 704 may include an input device 732, such as a keyboard, or a cursor control device 736, such as a mouse. An output device 728, such as a video display, may be located apart from the machine 702 (as shown), or made as an integral part of the machine 702.

A network interface device 740 to couple the processor 704 and other components to a network 744 may also be coupled to the bus 716. The instructions 712 may be transmitted or received over the network 744 via the network interface device 740 utilizing any one of a number of well-known transfer protocols (e.g., HyperText Transfer Protocol). Any of these elements coupled to the bus 716 may be absent, present singly, or present in plural numbers, depending on the specific embodiment to be realized.

The processor 704, the memories 720, 724, and the storage device 706 may each include instructions 712 which, when executed, cause the machine 702 to perform any one or more of the methodologies described herein. In some embodiments, the machine 702 operates as a standalone device or may be connected (e.g., networked) to other machines. In a networked environment, the machine 702 may operate in the capacity of a server or a client machine in server-client network environment, or as a peer machine in a peer-to-peer (or distributed) network environment.

The machine 702 may comprise a personal computer (PC), a workstation, a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 702 is illustrated, the term "machine" shall also be taken to include any collection of machines that individually or jointly execute a set (or multiple sets) of instructions to perform any one or more of the methodologies discussed herein.

While the machine-readable medium 708 is shown as a single medium, the term "machine-readable medium" should be taken to include a single medium or multiple media, e.g., a centralized or distributed database, and/or associated caches and servers, and or a variety of storage media, such as the registers of the processor 704, memories 720, 724, and the storage device 706 that store the one or more sets of instructions 712. The term "machine-readable medium" shall also be taken to include any medium that is capable of storing, encoding or carrying a set of instructions for execution by the machine and that cause the machine 702 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Using the apparatus, systems, and methods disclosed, those in the petroleum recovery industry and other industries may now be able to locate discontinuities in formations, such as fractures, with a higher level of confidence. Recovery operations, for example, may thus benefit from results that are obtained with increased accuracy and efficiency.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
   a multi-channel sensor array to receive radiated energy as scattered energy after interaction with a geologic formation, the interaction to include at least partial seismoelectric or electroseismic conversion between elastic and electromagnetic energy, wherein the multi-channel sensor array is to transform the scattered energy into received elastic signals and received electromagnetic signals;
   a processor; and
   a machine-readable medium having program code executable by the processor to cause the apparatus to,
      perform time-reversal propagation of the received elastic signals and the received electromagnetic signals in a numeric model of a volume of the geologic formation to generate time-reversed elastic signals and time-reversed electromagnetic signals;
      estimate at least one elastic source signature associated with the time-reversed elastic signals;
      estimate at least one seismoelectric source signature based on the at least one elastic source signature;
      estimate at least one electromagnetic signature associated with the time-reversed electromagnetic signals;
      compare the at least one seismoelectric source signature with the at least one electromagnetic signature; and
      identify locations of discontinuous features in the geologic formation based on the compare.

2. The apparatus of claim 1, wherein the multi-channel sensor array comprises:
   at least one of an elastic sensor; and
   at least one of an electromagnetic sensor.

3. The apparatus of claim 1, wherein the multi-channel sensor array comprises:
   orthogonal electric field antennas.

4. The apparatus of claim 1, wherein the program code executable by the processor to cause the apparatus to perform time-reversal propagation comprises program code executable by the processor to cause the apparatus to propagate in reverse time order the received elastic signals and the received electromagnetic signals back into the numerical model of the volume of the geologic formation.

5. The apparatus of claim 1, wherein the program code comprises program code executable by the processor to cause the apparatus to provide a model of propagation associated with a source of the radiated energy within the numeric model of the volume of the geologic formation.

6. The apparatus of claim 1, wherein the program code executable by the processor to cause the apparatus to compare comprises program code executable by the processor to cause the apparatus to determine when peak locations associated with an elastic-derived electromagnetic signature associated with the received elastic signals and a filtered, time-reversed electromagnetic signature associated with the received electromagnetic signals differ by less than a selected amount.

7. The apparatus of claim 1, wherein the program code comprises program code executable by the processor to cause the apparatus to estimate a trend of spectral power with frequency of a spectrum associated with the received electromagnetic signals or with frequency of a spectrum associated with an estimated electromagnetic source signature derived from the at least one elastic source signature.

8. A system, comprising:
   a down hole tool; and
   an apparatus coupled to the down hole tool, the apparatus comprising,
      a multi-channel sensor array to receive radiated energy as scattered energy after interaction with a geologic formation, the interaction to include at least partial seismoelectric or electroseismic conversion between elastic and electromagnetic energy, wherein the multi-channel sensor array is to transform the scattered energy into received elastic signals and received electromagnetic signals,
      a processor; and
      a machine-readable medium having program code executable by the processor to cause the apparatus to,
         perform time-reversal propagation of the received elastic signals and the received electromagnetic signals in a numeric model of a volume of the geologic formation to generate time-reversed elastic signals and time-reversed electromagnetic signals, estimate at least one elastic source signature associated with the time-reversed elastic signals, estimate at least one seismoelectric source signature based on the at least one elastic source signature;

estimate at least one electromagnetic signature associated with the time-reversed electromagnetic signals, compare the at least one seismoelectric signature with the electromagnetic signature, and identify locations of discontinuous features of the geologic formation based on the compare.

9. The system of claim 8, wherein the down hole tool comprises one of a wireline tool or a measurement while drilling tool.

10. The system of claim 8, comprising:
a drill bit to generate the radiated energy upon rotation within the geologic formation.

11. The system of claim 10, wherein the program code comprises program code executable by the processor to cause the apparatus to calculate a spectrum of the received elastic signals and the received electromagnetic signals or a spectrum of a forward-propagated, estimated electroseismic source signature.

12. A processor-implemented method to be executed on one or more processors that perform the method, comprising:

receiving radiated energy as scattered energy after the radiated energy interacts with a geologic formation, wherein the scattered energy is received at a sub-surface multi-channel sensor array that operates to transform the scattered energy into received elastic signals and received electromagnetic signals, and wherein the radiated energy is provided by a sub-surface source of elastic energy;

time-reversal signal or image processing of the received elastic signals and the received electromagnetic signals used in a numeric model of a volume of the geologic formation to generate time-reversed elastic signals and time-reversed electromagnetic signals;

estimating at least one elastic source signature associated with the time-reversed elastic signals;

estimating at least one seismoelectric signature based on the at least one elastic source signature;

estimating at least one electromagnetic signature associated with the time-reversed electromagnetic signals;

comparing the at least one seismoelectric signature with the least one electromagnetic signature; and identifying locations of discontinuous features in the geologic formation based on the comparing.

13. The processor-implemented method of claim 12, further comprising:
activating the sub-surface source of elastic energy within the geologic formation to provide the elastic energy by rotating a drill bit in the geologic formation.

14. The processor-implemented method of claim 13, comprising:
drilling a multilateral well bore, wherein the drilling is included in the activating, and wherein the sub-surface multi-channel sensor array is disposed in the multilateral well bore.

15. The processor-implemented method of claim 12, comprising:
iteratively specifying at least three potential locations of the sub-surface source.

16. The processor-implemented method of claim 12, wherein the comparing comprises:
comparing the at least one seismoelectric signature with the least one electromagnetic signature via convolution or a least-squares fit.

17. An article including a computer-accessible medium having instructions stored therein, wherein the instructions, when accessed, result in a computer performing:

receiving radiated energy as scattered energy after the radiated energy interacts with a geologic formation, wherein the scattered energy is received at a sub-surface multi-channel sensor array that operates to transform the scattered energy into received elastic signals and received electromagnetic signals, and wherein the radiated energy is provided by a sub-surface source of elastic energy;

time-reversal signal or image processing of the received elastic signals and the received electromagnetic signals used in a numeric model of a volume of the geologic formation to generate time-reversed elastic signals and time-reversed electromagnetic signals;

estimating at least one elastic source signature associated with the time-reversed elastic signals;

estimating at least one seismoelectric signature based on the at least one elastic source signature;

estimating at least one electromagnetic signature associated with the time-reversed electromagnetic signals;

comparing the at least one seismoelectric signature with the least one electromagnetic signature; and identifying locations of discontinuous features in the geologic formation based on the comparing.

18. The article of claim 17, wherein estimating the at least one elastic source signature associated with the time-reversed elastic signals comprises:
estimating the at least one elastic source signature directly from the time-reversed elastic signals, using an elastic formation model, a source model, and at least one estimated source location of the sub-surface source.

19. The article of claim 17, wherein the instructions, when accessed, result in the computer performing:
estimating an elastic-derived electromagnetic signature associated with the received elastic signals and a filtered, time-reversed electromagnetic signature associated with the received electromagnetic signals.

20. The article of claim 17, wherein the instructions, when accessed, result in the computer performing:
estimating a trend of spectral power with frequency of a spectrum associated with the received electromagnetic signals and with frequency of a spectrum associated with an estimated electromagnetic source signature derived from the at least one elastic source signature.

21. The article of claim 20, wherein the instructions, when accessed, result in the computer performing:
calculating a spectral trends ratio of the trend of spectral power with frequency of the spectrum associated with the received electromagnetic signals and the trend of spectral power with frequency of the spectrum associated with the estimated electromagnetic source signature derived from the at least one elastic source signature; and iterating the calculating of the spectral trends ratio after adjusting separation of sources of the radiated energy until the spectral trends ratio varies with frequency by less than a selected amount.

22. The article of claim 21, wherein the instructions, when accessed, result in the computer performing:

adjusting source separation based on the spectral trends ratio.

* * * * *